Figure 1:
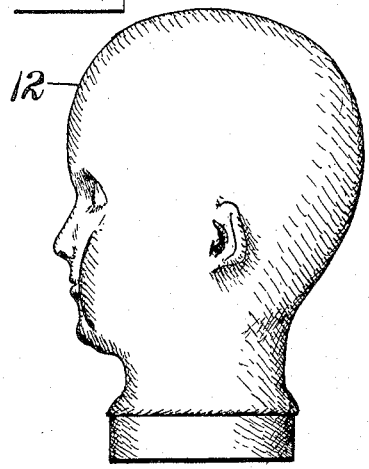

May 6, 1924.

S. COOPER 1,492,555

MOLD FOR FORMING ARTICLES FROM PULP OR OTHER PLASTIC MATERIAL

Filed Aug. 22, 1917

2 Sheets-Sheet 1

Simon Cooper, Inventor

By ____ Attorney

Frank J. Kent

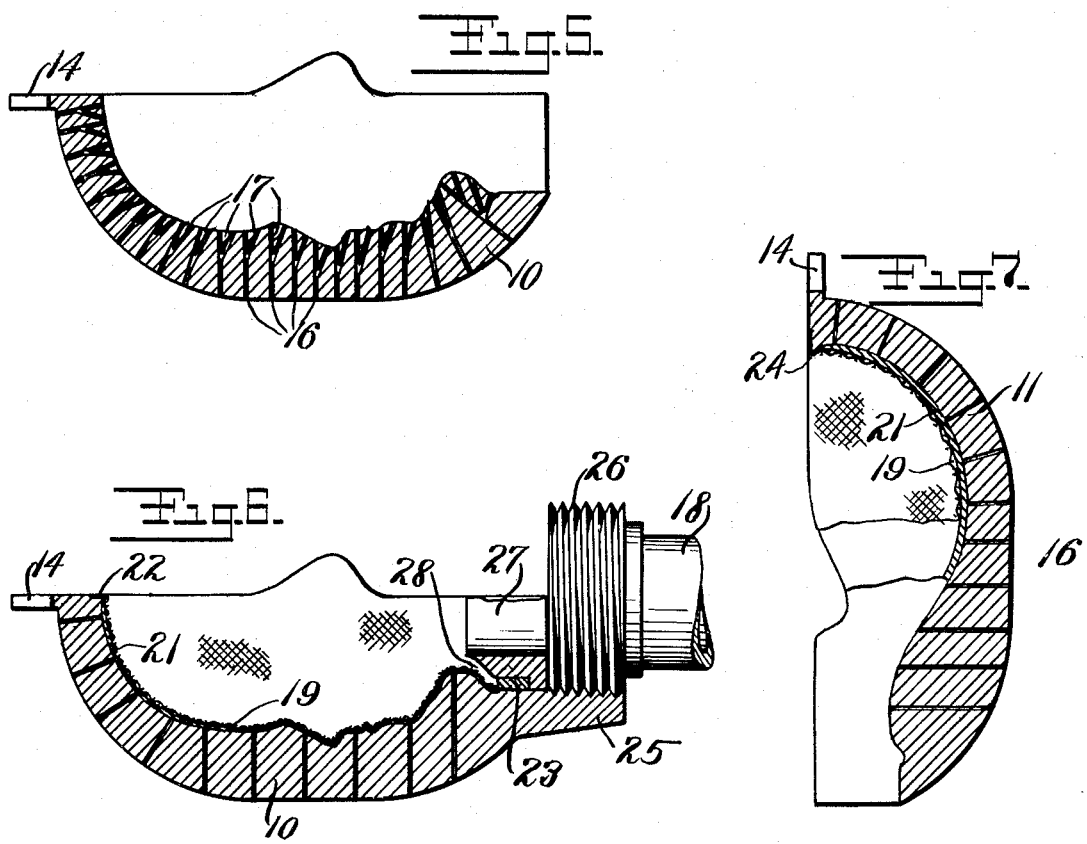
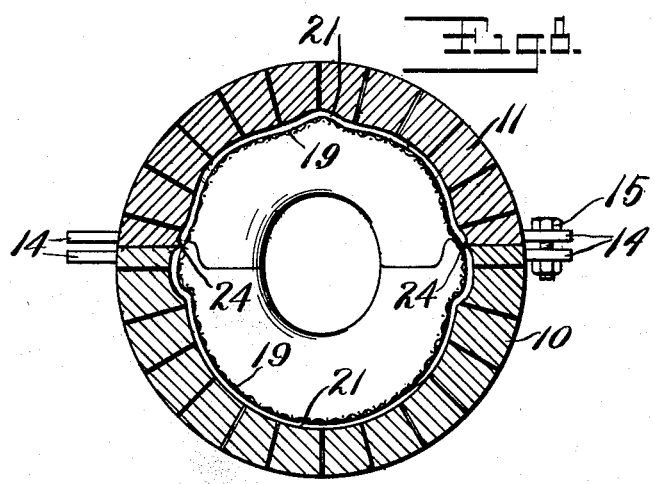

Patented May 6, 1924.

1,492,555

UNITED STATES PATENT OFFICE.

SIMON COOPER, OF BROOKLYN, NEW YORK, ASSIGNOR TO VACUUM PULP PRODUCTS CORPORATION, OF NEW YORK, N. Y., A CORPORATION OF VIRGINIA.

MOLD FOR FORMING ARTICLES FROM PULP OR OTHER PLASTIC MATERIAL.

Application filed August 22, 1917. Serial No. 187,542.

*To all whom it may concern:*

Be it known that I, SIMON COOPER, a citizen of the United States, residing at Brooklyn, in the county of Kings and State of New York, have invented certain new and useful Improvements in Molds for Forming Articles from Pulp or Other Plastic Material, of which the following is a specification.

This invention relates to molds for forming articles from pulp or other plastic material of a fibrous nature.

The objects of the invention are to provide a mold capable of producing such articles as dolls' heads and the like, which will give the desired detail and sharpness of outline and which at the same time will be strong, compact and inexpensive in its construction.

These objects are attained by the employment of a mold wall of relatively rigid character, having the necessary thickness and strength to resist the pressure of the material forced into the mold, shaped at its inner surface to conform to the outline to be produced and provided with multitudinous minute ducts extending from such inner surface to the outer surface of the mold. This shaped inner surface may be covered with a porous fabric lining, in which event channels are usually provided between the lining and the inner surface of the mold wall.

In the drawings, I have illustrated several preferred forms the invention may take and also shown in part how the mold may be produced.

Figure 2:
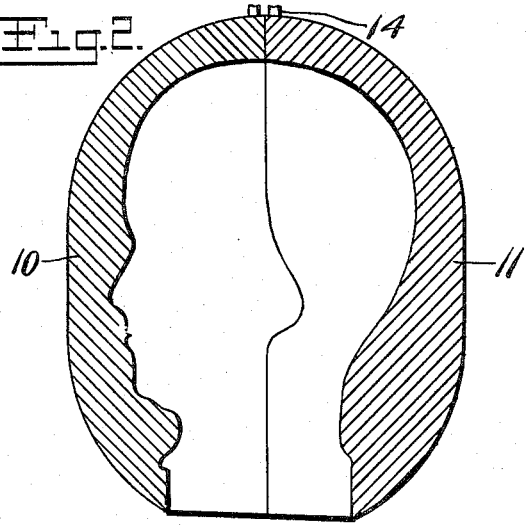
Figure 3:
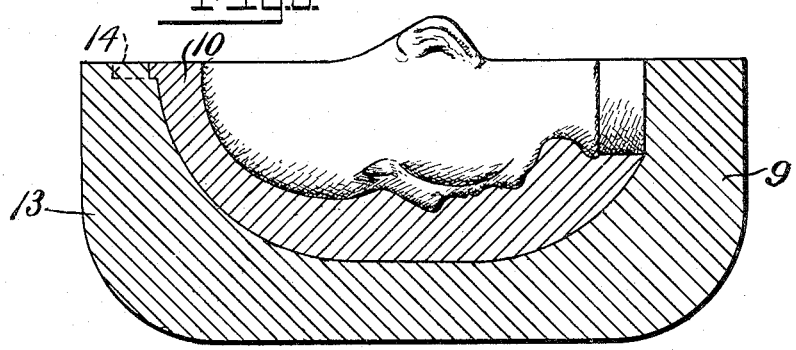
Figure 4:
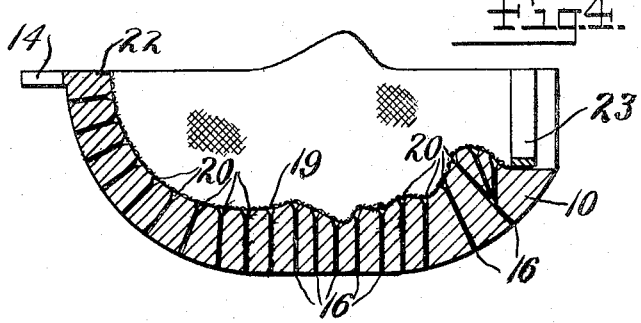

Figure 1 is a side view of a master pattern, in plaster or the like, for forming a doll's head; Figure 2 is a sectional view of the mold sections cast from such head; Figure 3 illustrates a method of obtaining the exterior form of the mold; Figure 4 is a sectional view of the front half of the completed mold; Figures 5 and 6 illustrate modifications in the mold structure; Figures 7 and 8 are sectional views illustrating detail features.

The mold body made up in the main of the front and back halves or sections 10 and 11, may be produced by conventional casting methods, using a pattern 12 to give the desired contour to the interior of the mold, and a suitable mold 13 to shape the exterior of the mold. These mold sections may be cast with lugs 14 or the like devices for securing the sections together through the agency of bolts or other fastenings 15.

The mold sections, it will be noted, are relatively thick and rigid in character so as to be self-supporting and strong enough to resist the pressure of the material introduced into the mold.

Extending through the mold wall, from the shaped inner surface to the exterior thereof are a multitude of relatively minute drainage ducts 16. In some cases the number of these ducts may be multiplied by branching them, as indicated at 17 in Figure 5. These constructions provide a self-supporting rigid mold wall whose inner surface conforms to the shape of the article to be produced and which, by means of the multitudinous ducts, enable an article of such shape being produced by applying suction to the exterior of the mold while the interior thereof is maintained in communication with a source of pulp supply. In Figure 6 there is indicated a pulp supply pipe 18, opening into the open end or mouth of the mold, from which it will be evident that as suction is applied to the exterior of the complete mold (as when the same is mounted in a closed chamber), the pulp will be sucked up into the mold chamber, filling the same and producing a deposit or thickened pulp layer on the inner surface of the mold, the liquid escaping through the many ducts in the mold walls, as the pulp rises in the mold, said ducts being of such size to hold back the pulp and insure a proper deposit of pulp. The suction may be regulated to produce the desired deposit or thickness and density of pulp wall.

The mold chamber may be lined with a gauze or porous fabric lining 19, and drainage channels may be provided between said lining and the inner surface of the mold walls as by forming grooves in such surface, as at 20 in Figure 4, or by interposing a porous layer of fabric such as felt or coarse cotton duck, between the lining and inner mold surface, as indicated at 21 in Figures 6–8. In both cases the lining is supported off the inner surface of the mold wall and drainage channels are provided communicating with the multitudinous drainage and suction ducts.

The lining is shown held in place by turning it over at the edges into a recess or rabbet 22 where it may be soldered or otherwise secured, and at the open end of the mold by a sectionalized ring 23 overlying the end of the lining. The lining may furthermore be worked over a head 24 at the meeting edges of the mold sections, as most clearly shown in Figures 7 and 8, the same serving to further assist in securing the lining and providing an uninterrupted porous surface presented to the pulp mixture.

In Figure 6 the mold is shown provided with an interiorly threaded extension 25 at the mouth thereof, engaging over a similarly threaded portion 26 on the pulp supply pipe, and the pulp supply pipe is further shown as carrying a forming ring 27 overlying the lining securing ring 23 and projecting therebeyond into the mold chamber where it terminates in a beveled lip spaced inward from the mold wall to provide a space 28 for forming the neck of the molded article. This forming member thus serves the double function of holding or reinforcing the securing ring and providing for the neck formation of the molded article.

I claim:

1. In a mold of the character set forth, relatively rigid self supporting mold walls having multitudinous minute ducts therethrough and forming a hollow mold open at one end for admission of material thereinto, a porous lining fitting the interior surface of said mold walls, and a securing ring overlying and holding in place the lining at the mouth of the mold.

2. In a mold of the character set forth, relatively rigid self supporting mold walls having multitudinous minute ducts therethrough and forming a hollow mold open at one end for admission of material thereinto, a porous lining fitting the interior surface of said mold walls, and a securing ring overlying and holding in place the lining at the mouth of the mold, and a neck forming ring overlying and projecting inwardly beyond the securing ring into the mouth of the mold, said forming ring having a shaped inner end spaced apart from the lining.

3. In combination, hollow complementary mold sections forming a mold chamber with a mouth at one end for admission of the material thereinto and interiorly threaded to engage over a threaded supply pipe, and a supply pipe having a threaded portion to fit the threaded mouth of the mold, and a shaped forming ring on the end of the supply pipe projecting within the mold chamber and spaced apart from the walls of the mold.

In testimony whereof I affix my signature.

SIMON COOPER.